(12) United States Patent
Wu

(10) Patent No.: US 6,352,270 B1
(45) Date of Patent: Mar. 5, 2002

(54) REAR BRAKE ASSEMBLY FOR A SCOOTER

(75) Inventor: Jack Wu, Taipei (TW)

(73) Assignee: Modas Shing Company Ltd., Taipei (TW)

( * ) Notice: Subject to any disclaimer, the term of this patent is extended or adjusted under 35 U.S.C. 154(b) by 0 days.

(21) Appl. No.: 09/688,158

(22) Filed: Oct. 16, 2000

(51) Int. Cl.⁷ .............................................. B62M 1/00
(52) U.S. Cl. ............................ 280/87.041; 280/11.206; 280/11.217; 188/19; 188/29
(58) Field of Search ................ 280/87.021, 87.041, 280/87.042, 160.1, 304.3, 11.204, 11.206, 11.208, 11.211, 11.215, 11.216, 11.217; 188/29, 19

(56) References Cited

U.S. PATENT DOCUMENTS

| | | | | |
|---|---|---|---|---|
| 2,861,814 A | * | 11/1958 | Rebhun | 280/243 |
| 3,288,251 A | * | 11/1966 | Sakwa | 188/29 |
| 4,003,582 A | * | 1/1977 | Maurer | 280/11.2 |
| 4,394,029 A | * | 7/1983 | Holmgren | 280/11.23 |
| 4,799,701 A | * | 1/1989 | Lindau et al. | 280/87.041 |
| 4,817,974 A | * | 4/1989 | Bergeron | 280/11.2 |
| 5,118,122 A | * | 6/1992 | Ricart | 280/11.2 |
| 5,927,733 A | * | 7/1999 | Banda | 280/87.041 |
| 6,250,656 B1 | * | 6/2001 | Ibarra | 280/87.041 |
| 6,286,632 B1 | * | 9/2001 | Chai | 188/29 |
| 6,296,082 B1 | * | 10/2001 | Tsai | 188/19 |
| 6,298,952 B1 | * | 10/2001 | Tsai | 188/29 |

\* cited by examiner

*Primary Examiner*—J. J. Swann
*Assistant Examiner*—J. Allen Shriver
(74) *Attorney, Agent, or Firm*—Rosenberg, Klein & Lee

(57) ABSTRACT

A brake assembly for a scooter has a braking assembly pivotally mounted at a rear end of a pedal of the scooter and in front of a rear wheel of the scooter. The brake assembly has an arcuate plate, two flanges respectively and concentrically formed at two bottom sides thereof, and two auxiliary wheels respectively and rotatably mounted on the flanges. A linkage assembly with a resilient member is mounted between the pedal and braking assembly. Whereby, when the braking assembly is trodden downward by a rider, the arcuate plate contacts the rear wheel and the auxiliary wheels contact the ground to increase friction to stop the scooter. When the braking assembly is released, it will return to the original position under the force of resilient member of the linkage assembly.

6 Claims, 5 Drawing Sheets

REAR BRAKE ASSEMBLY FOR A SCOOTER

BACKGROUND OF THE INVENTION

1. Field of the Invention

The present invention is related to a brake for a scooter, and more particularly to a brake which is mounted on a rear wheel of the scooter and can provide stability to the scooter when the rear wheel locks in braking.

2. Description of Related Art

A conventional rear brake for a scooter has an arcuate plate pivotally mounted at a rear end of the scooter. When a user wants to stop the scooter, the arcuate plate is pushed down to contact with a rear wheel to slow down and stop the scooter. However, the scooter will start to become unstable when the rear wheel locks in braking due to the single-point contact of the rear wheel with the ground, whereby a rider may suffer a frightening and possibly injurious experience.

Therefore, the invention provides a rear brake assembly for a scooter to mitigate and/or obviate the aforementioned problems.

SUMMARY OF THE INVENTION

The main objective of the present invention is to provide a brake assembly for a scooter which can maintain the scooter in a stable and controllable condition during a braking maneuver.

Other objects, advantages and novel features of the invention will become more apparent from the following detailed description when taken in conjunction with the accompanying drawings.

DETAILED DESCRIPTION OF THE PREFERRED EMBODIMENT

Figure 1:
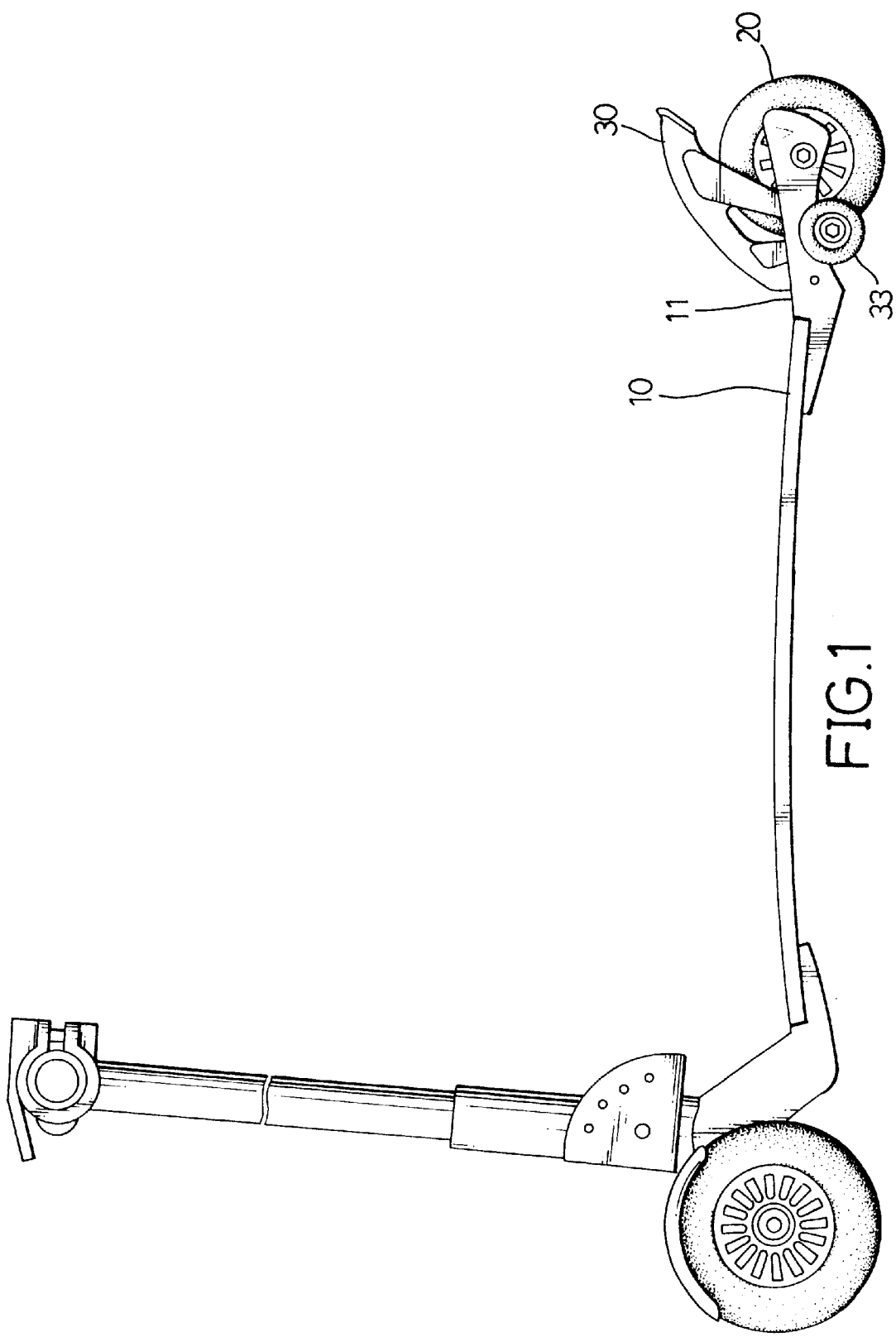
FIG. 1 is a front view of a scooter provided with a rear brake assembly in accordance with the present invention.
Figure 2:
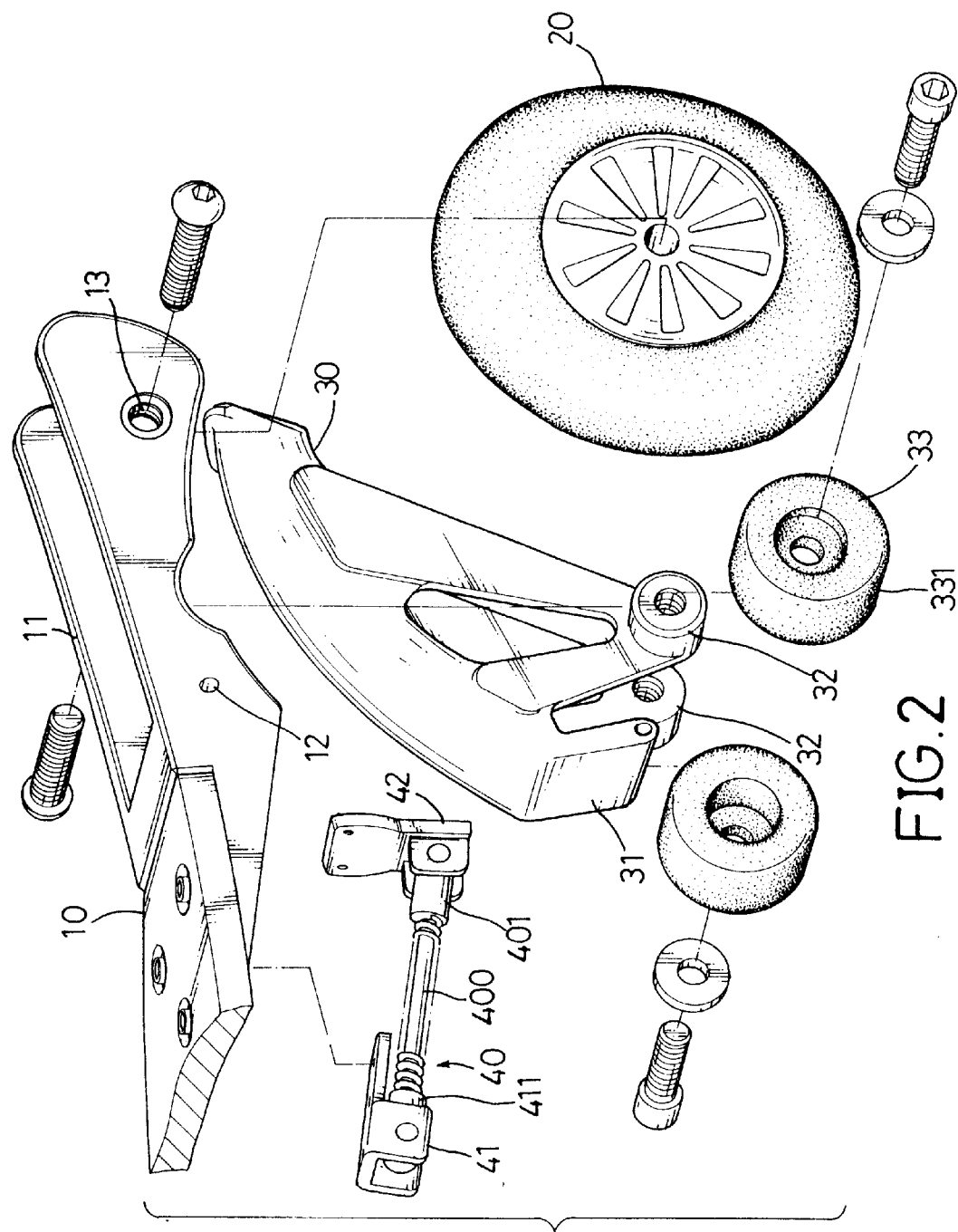
FIG. 2 is an enlarged exploded perspective view of the rear brake assembly in accordance with the present invention.
Figure 3:
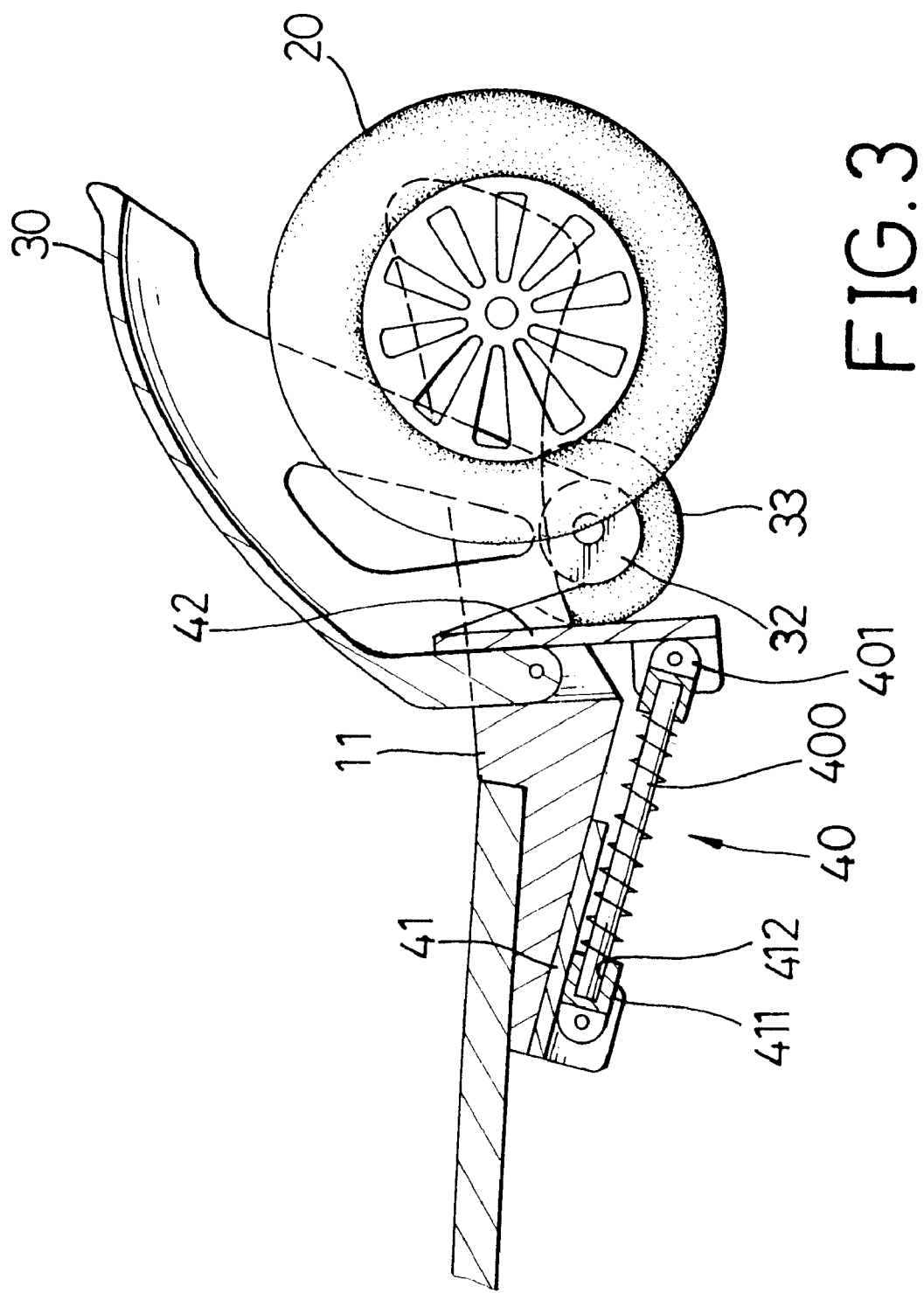
FIG. 3 is a partial sectional view of the rear brake assembly in FIG. 2.

Referring to FIGS. 1–3, a brake in accordance with the present invention is mounted over a rear wheel (20) of a scooter. A pedal (10) of the scooter has a rear fork (11) being composed of two parallel plates (not numbered) formed at a rear end thereof. A front hole (12) and a back hole (13) are defined through each plate of the fork (11). The rear wheel (20) is rotatably mounted at the back hole (13), and a braking member (30) is rotatably mounted at the front hole (12).

The braking member (30) has an upright plate (31) formed at a front end of an arcuate plate (not numbered). Two flanges (32) are respectively and concentrically formed at two sides of the arcuate plate. Two auxiliary wheels (33) are rotatably mounted on the flanges (32) respectively by two bolts.

A linkage assembly (40) has a bar (400) pivotally mounted on a front bracket (41) by a front joint (411) and on a rear bracket (42) by a rear joint (401). The front bracket (41) is fixed beneath the pedal (10), and the rear bracket (42) is fixed on an inside of the upright plate (31). The front joint (411) has a recess (412) defined therein and a front end of the bar (400) is received in the recess (412). A resilient member (not numbered) is provided on the bar (400).

Figure 4:
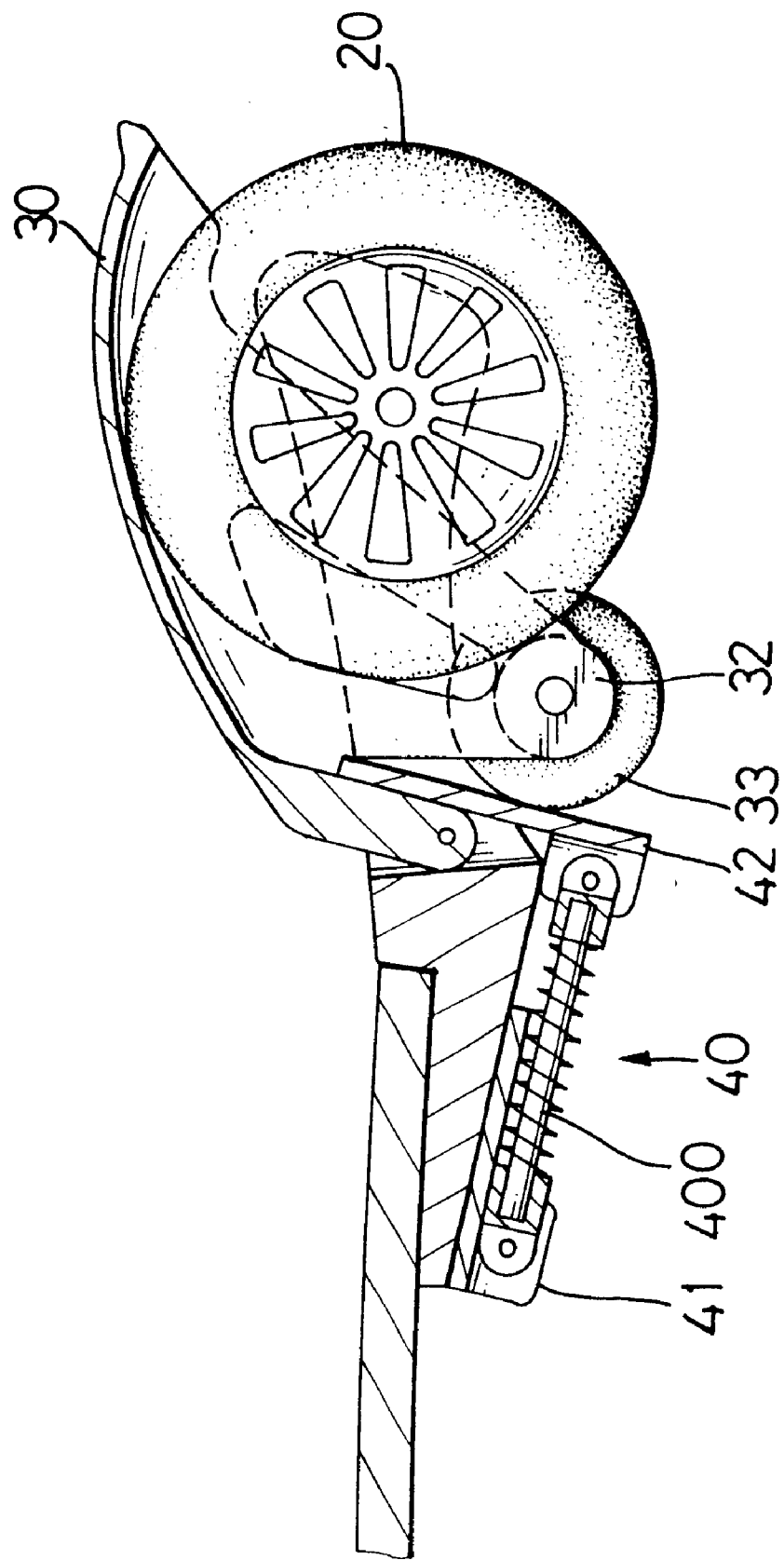
FIG. 4 is a partial sectional view showing the rear brake assembly being actuated.
Figure 5:
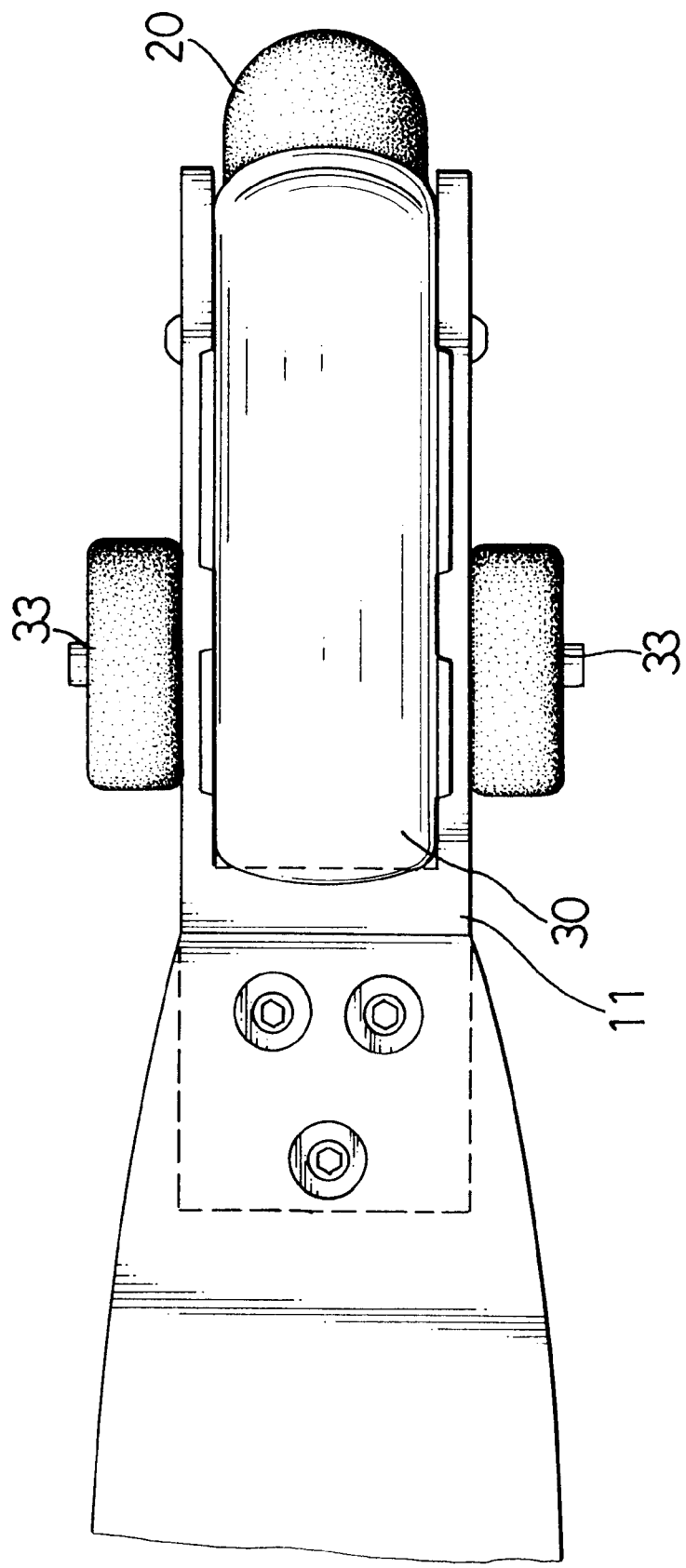
FIG. 5 is a top view of the rear brake assembly in FIG. 3.

Referring to FIGS. 4 and 5, to stop the scooter, a rider treads on the braking member (30) to pivot it downward about the front hole (12), and the arcuate plate contacts the rear wheel (20) to stop it rotating. At this time, the auxiliary wheels (33) descend due to their being fixed to the downward traveling arcuate plate and outer peripheries (331) of the wheels (33) contact the ground to increase friction for stopping the scooter. In addition to that increased friction, the scooter is stably supported by "three points"-the rear wheel (20) and the two auxiliary wheels (33) -at the rear portion and is prevented from becoming uncontrollable due to forces arising from a locking of the rear wheel (20). When the braking member (30) is released, it will be pushed up to back the original position by the linkage assembly (40) under the force of the resilient member.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A brake assembly for a scooter, comprising:
    a braking assembly (30) pivotally mounted at a rear end of a pedal (10) of the scooter and in front of a rear wheel (20) of the scooter, the brake assembly (30) having an arcuate plate, two flanges (32) respectively and concentrically formed at two bottom sides thereof, and two auxiliary wheels (33) respectively and rotatably mounted on the flanges (32); and
    a linkage assembly (40) with a resilient member mounted between the pedal (10) and braking assembly (30),
    whereby, when the braking assembly (30) is pushed to the rear wheel by a foot of a rider, the arcuate plate contacts the rear wheel (20) and the auxiliary wheels (33) contact the ground to increase friction to stop the scooter; and when the braking assembly is released from downward pressure of a rider's foot, it will return to the original position under the force of resilient member of the linkage assembly (40).

2. The brake assembly for a scooter as claimed in claim 1, wherein the pedal (10) has a rear fork (11) extending rearwards and having a front hole (12) and a rear hole (13) defined through the rear fork (11), wherein the braking assembly (30) is pivotally mounted at the front hole (12), and the rear wheel (20) is rotatably mounted at the rear hole (13).

3. The brake assembly for a scooter as claimed in claim 1, wherein the braking assembly (30) has an upright plate (31) formed at a front end thereof, and a rear end of the linkage assembly (40) is mounted inside the upright plate (31).

4. The brake assembly for a scooter as claimed in claim 3, wherein the linkage assembly (40) has a front plate (41) mounted beneath the pedal (10), and a rear plate (42) mounted inside the upright plate (31) of the braking assembly (30).

5. The brake assembly for a scooter as claimed in claim 4, wherein the linkage assembly (40) has a bar (400) pivotally mounted on the front plate (41) by a front joint (411) and on the rear plate (42) by a rear joint (401), wherein the resilient member is provided on the bar (400).

6. The brake assembly for a scooter as claimed in claim 5, wherein the front plate (41) has a recess (412) defined therein, and wherein the bar (400) is received in the recess (412).

\* \* \* \* \*